United States Patent
Keller et al.

(10) Patent No.: US 12,005,893 B2
(45) Date of Patent: Jun. 11, 2024

(54) METHOD FOR GUIDING A MOTOR VEHICLE IN AN AT LEAST PARTLY AUTOMATED MANNER

(71) Applicants: Robert Bosch GmbH, Stuttgart (DE); Daimler AG, Stuttgart (DE)

(72) Inventors: Christoph Gustav Keller, Stuttgart (DE); Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 659 days.

(21) Appl. No.: 17/262,966

(22) PCT Filed: Jul. 25, 2019

(86) PCT No.: PCT/EP2019/070054
§ 371 (c)(1),
(2) Date: Jan. 25, 2021

(87) PCT Pub. No.: WO2020/025445
PCT Pub. Date: Feb. 6, 2020

(65) Prior Publication Data
US 2021/0261125 A1 Aug. 26, 2021

(30) Foreign Application Priority Data
Aug. 2, 2018 (DE) .................... 10 2018 118 761.0

(51) Int. Cl.
*B60W 30/095* (2012.01)
*B60W 40/04* (2006.01)

(52) U.S. Cl.
CPC ........ *B60W 30/0956* (2013.01); *B60W 40/04* (2013.01); *B60W 2554/4041* (2020.02)

(58) Field of Classification Search
CPC ........... B60W 60/001; B60W 50/0097; B60W 50/0205; B60W 2420/40; B60W 2420/42;
(Continued)

(56) References Cited

U.S. PATENT DOCUMENTS 11,577,752 B2 * 2/2023 Schuller ................. G08G 1/166
2008/0065328 A1 3/2008 Eidehall et al.
(Continued)

FOREIGN PATENT DOCUMENTS

DE  10 2014 013 218 A1  4/2015
DE  10 2014 219 110 A1  3/2016
(Continued)

OTHER PUBLICATIONS

International Search Report corresponding to PCT Application No. PCT/EP2019/070054, mailed Nov. 20, 2019 (German and English language document) (6 pages).
(Continued)

*Primary Examiner* — Robert T Nguyen
(74) *Attorney, Agent, or Firm* — Maginot, Moore & Beck LLP

(57) ABSTRACT

A method for at least partly automated driving of a motor vehicle includes receiving environment signals that represent an environment of the motor vehicle, processing the environment signals to detect a dynamic object in the environment, and predicting a movement of the detected dynamic object based on infrastructure data that represent an infrastructure of the environment. The method further includes generating control signals for at least partly automated control of the lateral and longitudinal guidance of the motor vehicle based on the predicted movement, and outputting the generated control signals to drive the motor vehicle at least partly automatically based on the predicted movement.

8 Claims, 2 Drawing Sheets

(58) Field of Classification Search
CPC ......... B60W 2420/52; B60W 60/0015; B60W 2050/0215; B60W 50/02; B60W 30/14; B60W 40/02; B60W 2050/0059; B60W 2556/45; G06N 20/00; G06N 3/045; G06N 3/08; G05D 1/0289; G05D 1/633

See application file for complete search history.

(56) References Cited

U.S. PATENT DOCUMENTS

| | | | | |
|---|---|---|---|---|
| 2016/0375900 A1* | 12/2016 | Laur | ................. | B60T 7/12 701/41 |
| 2018/0052005 A1* | 2/2018 | Schilling | ................. | G08G 1/167 |
| 2018/0315314 A1* | 11/2018 | Gilsenan | ......... | B60W 30/18163 |
| 2018/0362031 A1* | 12/2018 | Chang | ............... | B60W 30/0956 |
| 2021/0237736 A1* | 8/2021 | Keller | ................. | B60W 30/08 |
| 2022/0126863 A1* | 4/2022 | Moustafa | ........... | G08G 1/09626 |
| 2022/0340172 A1* | 10/2022 | Pendleton | ......... | B60W 30/0956 |

FOREIGN PATENT DOCUMENTS

| | | |
|---|---|---|
| DE | 10 2016 209 735 A1 | 12/2017 |
| DE | 10 2016 220 102 A1 | 4/2018 |
| WO | 2016/209425 A1 | 12/2016 |

OTHER PUBLICATIONS

Kooij, J. F. P. et al., "Context-Based Path Prediction for Targets with Switching Dynamics," International Journal of Computer Vision, Jul. 2018, vol. 127, No. 3, 239-262 (24 pages).

* cited by examiner

METHOD FOR GUIDING A MOTOR VEHICLE IN AN AT LEAST PARTLY AUTOMATED MANNER

This application is a 35 U.S.C. § 371 National Stage Application of PCT/EP2019/070054, filed on Jul. 25, 2019, which claims the benefit of priority to Serial No. DE 10 2018 118 761.0, filed on Aug. 2, 2018 in Germany, the disclosures of which are incorporated herein by reference in their entirety.

The disclosure relates to a method of at least partly automated driving of a motor vehicle. The disclosure further relates to a device which is set up to carry out all the processes of the method for at least partly automated control of a motor vehicle. The disclosure also relates to a computer program. The disclosure also relates to a machine-readable memory medium.

BACKGROUND

Methods for predicting dynamic road users on urban traffic routes are known. Usually, these methods use pure model assumptions about the kinematic degrees of freedom of a previously classified dynamic object (motor vehicle, pedestrian), without using the available infrastructure.

In the case of trams in particular, this procedure is a major difficulty, since the turning of a tram and thus the crossing of possible traffic routes of a motor vehicle can usually take place with a small turning radius and there is a high risk of collision.

SUMMARY

The objective underlying the disclosure is to provide an efficient concept for at least partly automated control of a motor vehicle.

This objective is achieved by means of the respective subject matter of the disclosure. Advantageous embodiments of the disclosure are the subject matter of the disclosure.

According to a first aspect, a method is provided for at least partly automated driving of a motor vehicle, including the following steps:
  receiving environment signals representing an environment of the motor vehicle,
  processing the environment signals to detect a dynamic object in the environment,
  on detecting a dynamic object, predicting a movement of the dynamic object based on infrastructure data representing the infrastructure of the environment. generating control signals for at least partly automated control of the lateral and longitudinal guidance of the motor vehicle based on the predicted movement and outputting the generated control signals to at least partly automatically drive the motor vehicle based on the predicted movement.

According to a second aspect, a device is provided which is set up to carry out all the steps of the method for at least partly automated driving of a motor vehicle.

According to a third aspect, a motor vehicle is provided which comprises the device according to the second aspect.

According to a fourth aspect, a computer program is provided, comprising commands that cause it to carry out a method for at least partly automated driving of a motor vehicle when a computer executes the computer program.

According to a fifth aspect, a machine-readable memory medium is provided on which the computer program is stored.

The disclosure is based on the realization that the above objective can be achieved by predicting the movement of the dynamic object based on infrastructure data representing the infrastructure of the environment. In other words, the information about the infrastructure is used to predict the movement of the dynamic object.

As a result, for example, the technical advantage is brought about that boundary conditions of the movement of the dynamic object can be considered efficiently. In particular, therefore, account is taken of the fact that a dynamic object must take into account specifications and/or boundaries set by the infrastructure in terms of its movement. The infrastructure thus specifies, so to speak, spaces within which the dynamic object can move at all. Thus, for example, a dynamic object cannot be located in the same place or at the same position as a stationary object of the infrastructure.

Based on the prediction of the movement of the dynamic object, control signals are then generated and output for at least partly automated control of the lateral and longitudinal guidance of the motor vehicle in order to be able to drive the motor vehicle at least partly automatically based on the prediction of the movement of the dynamic object.

Thus, the technical advantage is brought about that a concept for at least partly automated efficient driving of a motor vehicle is provided.

The phrase "at least partly automated control or driving" includes the following cases: partly automated control or driving, highly automated control or driving, fully automated control or driving, driverless control or driving.

Partially automated control or driving means that in a specific use case (for example: driving on a highway, driving inside a parking lot, overtaking an object, driving within a lane, which is determined by lane markers) the longitudinal and transverse driving of the motor vehicle can be controlled automatically. A driver of the motor vehicle does not have to manually control the longitudinal and transverse driving of the motor vehicle. The driver must however permanently monitor the automatic control of the longitudinal and transverse driving, in order to be able to intervene manually if necessary.

Highly automated control or driving means that in a specific use case (for example: driving on a highway, driving within a parking lot, overtaking an object, driving within a lane, which is determined by lane markings) the longitudinal and transverse driving of the motor vehicle can be controlled automatically. A driver of the motor vehicle does not have to manually control the longitudinal and transverse driving of the motor vehicle. The driver does not have to permanently monitor the automatic control of the longitudinal and transverse driving in order to be able to intervene manually if necessary. If necessary, a takeover request is automatically sent to the driver to take over the control of the longitudinal and transverse driving. The driver must therefore potentially be able to control the longitudinal and transverse driving.

Fully automated control or driving means that in a specific use case (for example: driving on a highway, driving within a parking lot, overtaking an object, driving within a lane, which is determined by lane markings) the longitudinal and transverse driving of the motor vehicle are automatically controlled. A driver of the motor vehicle does not have to manually control the longitudinal and transverse driving of the motor vehicle. The driver does not have to monitor the automatic control of the longitudinal and transverse driving in order to be able to intervene manually if necessary. In the specific use case, the driver is not required.

Driverless control or driving means that regardless of a specific use case (for example: driving on a highway, driving inside a parking lot, overtaking an object, driving within a lane, which is determined by lane markings) the longitudinal and transverse driving of the motor vehicle are controlled automatically. A driver of the motor vehicle does not have to manually control the longitudinal and transverse driving of the motor vehicle himself. The driver does not have to monitor the automatic control of the longitudinal and transverse driving in order to be able to intervene manually if necessary. The longitudinal and transverse driving of the vehicle are thus controlled automatically, for example, for all road types, speed ranges and environmental conditions. The driver's entire driving task is thus automatically taken over. The driver is therefore no longer required. The motor vehicle can therefore drive without a driver from any starting position to any target position. Potential problems are solved automatically, i.e. without the help of the driver.

The dynamic object is, for example, one of the following objects: a rail vehicle, for example a tram, another motor vehicle, a pedestrian, and a cyclist.

In particular, a dynamic object refers to an object with a speed greater than zero m/s.

For example, infrastructure data represent the geometry of a traffic route ahead of the dynamic object.

A transport route is a road for example or rails for example.

According to one embodiment, it is provided that a traffic route ahead of the dynamic object is determined based on the infrastructure data, wherein the movement of the dynamic object is predicted on the basis of the determined traffic route.

As a result, for example, the technical advantage is brought about that the movement of the dynamic object can be predicted efficiently. This takes into account that a dynamic object usually moves on a traffic route. This means, for example, that another motor vehicle will be driving on a road. This means, for example, that a pedestrian will usually walk on a pedestrian path as long as he does not want to cross a road. This means, for example, that a tram will move on rails.

Insofar as the traffic route ahead is determined on the basis of the infrastructure data, an efficient indication can be given about where the dynamic object is likely to move.

According to one embodiment, it is provided that a current position of the dynamic object is determined based on the environment signals.

As a result, for example, this brings about the technical advantage that the current position of the dynamic object can be determined efficiently.

According to one embodiment, it is provided that the determined current position is matched with the determined traffic path ahead in order to determine a matched current position of the dynamic object which is plausible in relation to the determined traffic route ahead.

As a result, for example, this brings about the technical advantage that the determined current position can be efficiently plausibility checked in relation to the determined traffic route ahead.

Therefore, if, for example, the traffic route ahead is a road and if, for example, the dynamic object is another motor vehicle, then the current position of the other motor vehicle is on the road.

For example, if the dynamic object is a rail vehicle and, for example, if the traffic route ahead is a rail route, the current position of the rail vehicle must be on the rails.

In one embodiment, it is provided that, if the dynamic object is a rail vehicle, the traffic route is a rail route ahead of the rail vehicle.

As a result, for example, this brings about the technical advantage that a movement of a rail vehicle can be predicted efficiently. In particular, as a result, for example, this brings about the technical advantage that a movement of a rail vehicle can be taken into account efficiently for the at least partly automated driving of the motor vehicle.

According to one embodiment, it is provided that the infrastructure data are determined based on the environment signals.

As a result, for example, this brings about the technical advantage that the infrastructure data are determined efficiently.

For example, it is provided that the environment signals are processed to determine the infrastructure data.

According to one embodiment, it is provided that the infrastructure data include map data of a digital map.

As a result, for example, this brings about the technical advantage that the information of a digital map can be taken into account efficiently.

In one embodiment, it is provided that the map data of the digital map are received.

According to one embodiment, it is provided that based on the predicted movement it is determined whether the motor vehicle will cross the dynamic object, wherein, if so, a trajectory is determined in order to drive the motor vehicle at least partly automatically at least at a determined safety distance from the dynamic object, in particular to stop the motor vehicle at least partly automatically at least at the predetermined safety distance, wherein the control signals are generated based on the determined trajectory.

As a result, for example, this brings about the technical advantage that the risk of a collision with the dynamic object can be reduced efficiently. In particular, for example, the technical advantage can be brought about that a collision with the dynamic object can be avoided efficiently.

In one embodiment, it is provided that the dynamic object is classified, wherein the movement of the object is predicted based on the classification.

As a result, for example, this brings about the technical advantage that the movement of the object can be predicted efficiently.

Classifying includes, for example, classifying the dynamic object as another motor vehicle, as a pedestrian, as a cyclist or as a rail vehicle, for example as a tram.

According to one embodiment, environment signals will include environment sensor data of one or more environment sensors of the motor vehicle.

An environment sensor is, for example, one of the following environment sensors: radar sensor, lidar sensor, ultrasonic sensor, infrared sensor, magnetic field sensor and video sensor.

In one embodiment, it is provided that the motor vehicle according to the third aspect is set up or designed to perform or carry out the method according to the first aspect.

In a further embodiment, it is provided that the method in accordance with the first aspect is performed or carried out by means of the device according to the second aspect and/or by means of the motor vehicle according to the third aspect.

Device features result analogously from corresponding features of the method and vice versa. This means in particular that technical functionalities of the method according to the first aspect result from corresponding technical functionalities of the device according to the second aspect.

This means in particular that further embodiments of the device according to the second aspect result analogously from corresponding embodiments of the method according to the first aspect.

BRIEF DESCRIPTION OF THE DRAWINGS

The disclosure is explained in more detail below on the basis of preferred exemplary embodiments. In the figures

DETAILED DESCRIPTION

Figure 1:
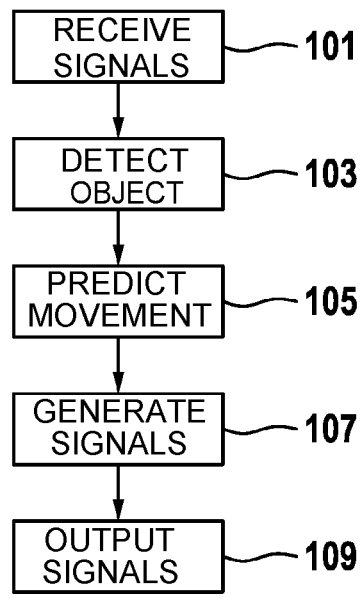
FIG. 1 shows a flowchart of a method for at least partly automated control of a motor vehicle.

FIG. 1 shows a flowchart of a method for at least partly automated driving of a motor vehicle, including the following steps:
Receiving 101 environment signals representing the environment of the motor vehicle,
Processing 103 the environment signals to detect a dynamic object in the environment,
On detecting a dynamic object, predicting 105 a movement of the dynamic object based on infrastructure data representing the infrastructure of the environment,
Generating 107 control signals for at least partly automated control of the lateral and longitudinal guidance of the motor vehicle based on the predicted movement and
outputting 109 the generated control signals to drive the motor vehicle at least partly automatically based on the predicted movement.

Figure 2:
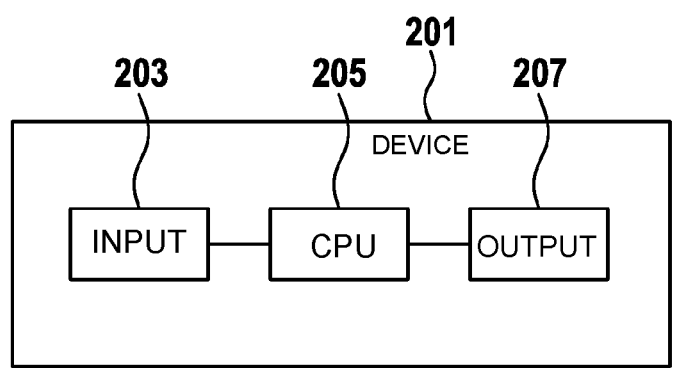
FIG. 2 shows a device which is set up to carry out all the steps of a method for at least partly automated control of a motor vehicle.

FIG. 2 shows a device 201 which is set up to carry out all steps of a method for at least partly automated driving of a motor vehicle.

For example, the device 201 is designed to perform all steps of the method according to FIG. 1.

The device 201 comprises an input 203 for receiving environment signals representing an environment of the motor vehicle.

The device 201 also comprises a processor 205 for processing the environment signals to detect a dynamic object in the environment.

The processor 205 is designed to predict a movement of the dynamic object based on infrastructure data on detecting a dynamic object, wherein the infrastructure data represent an infrastructure of the environment.

The processor 205 is further designed to generate control signals for at least partly automated control of the lateral and longitudinal guidance of the motor vehicle based on the predicted movement.

The device 201 comprises an output 207 for outputting the generated control signals for driving the motor vehicle at least partly automatically based on the predicted movement.

For example, the generated control signals are output to a control device, which is designed to at least partly automatically control the lateral and longitudinal guidance of the motor vehicle based on the output control signals.

In one embodiment, instead of the one processor 205, several processors are provided.

Information, data and/or signals that are received are generally received by means of the input 203, for example.

Signals that are output are generally output by means of the output 207, for example.

Figure 3:
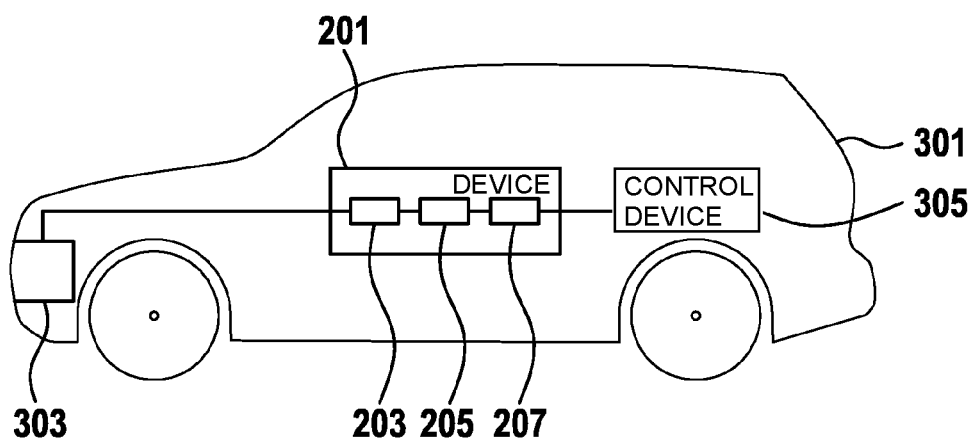
FIG. 3 shows a motor vehicle and FIG. 4 shows a machine-readable memory medium.

FIG. 3 shows a motor vehicle 301.

The motor vehicle 301 comprises the device 201 according to FIG. 2.

The motor vehicle 301 includes an environment sensor 303, for example a radar sensor.

For example, environment sensor data of the environment sensor 303 are provided to the input 203. Therefore this means, for example, that the input 203 receives the environment sensor data of the environment sensor 303. For example, the processor 205 processes these received environment sensor data to detect an object in the vicinity of the vehicle 301.

For example, in addition to the environment sensor 303, the motor vehicle 301 also comprises one or more other environment sensors. For example, the motor vehicle 301 comprises a video sensor and/or an ultrasonic sensor. The corresponding environment sensor data of these environment sensors are then also provided, for example, to the input 203.

The control signals issued by means of the output 207 are output to a control device 305 of the motor vehicle 301, for example, wherein the control device 305 is set up to at least partly automatically control the lateral and longitudinal guidance of the motor vehicle 301 based on the output control signals.

Figure 4:
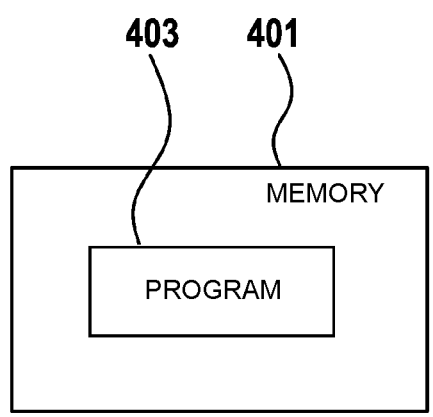

FIG. 4 shows a machine readable memory medium 401 on which a computer program 403 is stored. The computer program 403 contains commands which carry out a method for at least partly automated control of a motor vehicle when the computer program 403 is executed by a computer, for example by means of the device 201 according to FIG. 2.

In one embodiment, it is provided that the movement of the dynamic object is predicted based on a predetermined model. For example, such a predetermined model uses kinematic degrees of freedom of the dynamic object, such as the previously classified dynamic object.

In addition to the use of the predetermined model for the prediction, the infrastructure data are also used.

If the dynamic object is classified as a rail vehicle, for example as a tram, it is provided according to one embodiment that a rail route ahead of the rail vehicle is determined. This will be carried out, inter alia, in order to determine whether the motor vehicle will cross the rail route, in particular will cross the rail route within the framework of a comfortable braking distance of the motor vehicle.

In one embodiment it is provided that an environment of the motor vehicle is captured by means of an environment sensor or by means of multiple environment sensors.

According to one embodiment, the environment sensor data corresponding to this capture are received. These environment sensor data thus represent an environment of the motor vehicle.

These environment sensor data are stored according to one embodiment in order to detect a dynamic object in the environment.

On detecting a dynamic object in the environment, according to one embodiment it is provided to classify the detected dynamic object. For this classification, for example, one or for example multiple classifiers are used.

The classifier is or the classifiers are implemented in the processor 205 and/or in the computer program, for example.

If the dynamic object is classified as a rail vehicle, for example as a tram, according to one embodiment a rail route ahead of the rail vehicle is determined. According to one embodiment, the environment signals, i.e. in particular the environment sensor data, are used for this purpose. Alternatively or additionally, according to one embodiment map data of a digital map are used for the determination of the rail route ahead.

The map data of the digital map are received by means of the input 203 of the device 201, for example.

The map data of the digital map are received from a navigation system or are read out from this, for example.

According to one embodiment, a local probability of the rail vehicle, for example the tram, is calculated based on the determined rail route or the rail geometry. This means in particular that a current position of the rail vehicle is determined based on the environment signals, wherein the determined current position is compared with the determined rail route ahead in order to determine a matched current position of the rail vehicle, which is plausible in relation to the determined rail route ahead.

According to one embodiment, it is provided that the movement of the dynamic object, for example the rail vehicle, is predicted based on one or more kinematic variables of the dynamic object, for example the rail vehicle.

A kinematic variable of the dynamic object, for example the rail vehicle, is, for example, a speed or a deceleration of the dynamic object, for example of the rail vehicle.

These kinematic variables are determined, for example, based on the environment signals, for example based on the environment sensor data.

Should a crossing situation ahead with the dynamic object, for example with the rail vehicle, arise for the motor vehicle, according to one embodiment it is provided that the motor vehicle is decelerated in such a way that it stops with an adequate safety distance, i.e. before the crossing situation, therefore before the traffic junction, and waits for the dynamic object, for example the rail vehicle, to pass. This means that corresponding control signals are generated for this purpose, based on which the lateral and longitudinal guidance of the motor vehicle can be controlled at least partly automatically, so that it can be stopped at a predetermined safety distance, here the adequate safety distance, at least partly automatically and waits for the dynamic object, for example the rail vehicle, to pass.

In the absence of another dynamic object, for example the rail vehicle, according to one embodiment an original maneuver is resumed, or an original trajectory is continued.

The advantages of the concept described here are, for example, the legally compliant treatment of a rail vehicle, for example a tram, in accordance with the road traffic code (StVO) and a reduction of the risk of a collision with a rail vehicle and the implementation of customer-oriented behavior of a motor vehicle regarding trams.

The motor vehicle is, for example, a shuttle vehicle, an automobile, a robot taxi, or a commercial vehicle, for example a commercial motor vehicle.

The invention claimed is:

1. A method for at least partly automated driving of a motor vehicle, comprising:
   receiving environment signals that represent an environment of the motor vehicle;
   processing the environment signals to detect a dynamic object in the environment;
   predicting a movement of the detected dynamic object based on infrastructure data that represent an infrastructure of the environment;
   generating control signals for at least partly automated control of the lateral and longitudinal guidance of the motor vehicle based on the predicted movement; and
   outputting the generated control signals to drive the motor vehicle at least partly automatically based on the predicted movement,
wherein predicting the movement comprises:
   determining a traffic route ahead of the dynamic object based on the infrastructure data, wherein the movement of the dynamic object is predicted based on the determined traffic route;
   determining a current position of the dynamic object based on the environment signals; and
   comparing the determined current position with the determined traffic route ahead in order to determine a matched current position of the dynamic object, which is plausible in relation to the determined traffic route ahead.

2. The method as claimed in claim 1, wherein the traffic route is determined to be a rail route ahead of a rail vehicle when the dynamic object is the rail vehicle.

3. The method as claimed in claim 1, further comprising:
   classifying the dynamic object, wherein the movement of the dynamic object is predicted based on the classification.

4. The method as claimed in claim 1, further comprising:
   at least one of determining the infrastructure data based on the environment signals, and providing the infrastructure data in the form of map data of a digital map.

5. The method as claimed in claim 1, further comprising:
   determining based on the predicted movement when the motor vehicle will cross the dynamic object;
   determining a trajectory to at least one of drive the motor vehicle at least partly automatically at least at a predetermined safety distance from the dynamic object, and stop the motor vehicle at the predetermined safety distance from the dynamic object at least partly automatically, wherein the control signals are generated based on the determined trajectory.

6. A device for use in at least partly automated driving of a motor vehicle comprising:
   a computer program, including commands; and
   a computer operably connected to the computer program and configured to execute the commands to
     receive environment signals that represent an environment of the motor vehicle,
     process the environment signals to detect a dynamic object in the environment,
     predict a movement of the detected dynamic object based on infrastructure data that represent an infrastructure of the environment,
     generate control signals for at least partly automated control of the lateral and longitudinal guidance of the motor vehicle based on the predicted movement, and
     output the generated control signals to drive the motor vehicle at least partly automatically based on the predicted movement,
wherein predicting the movement comprises:
   determining a traffic route ahead of the dynamic object based on the infrastructure data, wherein the movement of the dynamic object is predicted based on the determined traffic route;
   determining a current position of the dynamic object based on the environment signals; and
   comparing the determined current position with the determined traffic route ahead in order to determine a matched current position of the dynamic object, which is plausible in relation to the determined traffic route ahead.

7. A motor vehicle, comprising:

a device including a computer program, including commands and a computer operably connected to the computer program and configured to execute the commands to receive environment signals that represent an environment of the motor vehicle, process the environment signals to detect a dynamic object in the environment, predict a movement of the detected dynamic object based on infrastructure data that represent an infrastructure of the environment, generate control signals for at least partly automated control of the lateral and longitudinal guidance of the motor vehicle based on the predicted movement, and output the generated control signals to drive the motor vehicle at least partly automatically based on the predicted movement, wherein predicting the movement comprises:

determining a traffic route ahead of the dynamic object based on the infrastructure data, wherein the movement of the dynamic object is predicted based on the determined traffic route;

determining a current position of the dynamic object based on the environment signals; and comparing the determined current position with the determined traffic route ahead in order to determine a matched current position of the dynamic object, which is plausible in relation to the determined traffic route ahead.

8. The device of claim 7, wherein the computer program is permanently stored in a machine-readable memory medium.

* * * * *